(12) United States Patent  (10) Patent No.: US 7,454,840 B2
Delfini et al.  (45) Date of Patent: Nov. 25, 2008

(54) LASER MARKING DEVICE (75) Inventors: Stefano Delfini, Bettlach (CH); Beat Gerber, Utzenstorf (CH); Christian Ackermann, Ramiswil (CH)

(73) Assignee: Robert Bosch GmbH, Stuttgart (DE)

( * ) Notice: Subject to any disclaimer, the term of this patent is extended or adjusted under 35 U.S.C. 154(b) by 98 days.

(21) Appl. No.: 10/579,665

(22) PCT Filed: Sep. 30, 2005

(86) PCT No.: PCT/EP2005/054945

§ 371 (c)(1),
(2), (4) Date: May 18, 2006

(87) PCT Pub. No.: WO2006/035071

PCT Pub. Date: Apr. 6, 2006

(65) Prior Publication Data

US 2007/0144019 A1    Jun. 28, 2007

(30) Foreign Application Priority Data

Sep. 30, 2004    (DE) .................. 10 2004 047 603

(51) Int. Cl.
*G01C 15/02*    (2006.01)
(52) U.S. Cl. .................... 33/286; 33/DIG. 21; 33/484
(58) Field of Classification Search .................. 33/227, 33/281, 282, 285, 286, 293, 473, 484, 485, 33/496, 534, DIG. 21
See application file for complete search history.

(56) References Cited

U.S. PATENT DOCUMENTS

| 4,440,168 | A | * | 4/1984 | Warren ..................... 33/534 |
| 5,505,000 | A |   | 4/1996 | Cookie et al. |
| 5,531,031 | A |   | 7/1996 | Green et al. |
| 5,566,459 | A | * | 10/1996 | Breda ...................... 33/290 |
| 5,842,282 | A | * | 12/1998 | Ting ................... 33/DIG. 21 |
| 6,012,229 | A | * | 1/2000 | Shiao ................. 33/DIG. 21 |
| 6,134,795 | A | * | 10/2000 | Hitchcock ................. 33/451 |
| 6,163,969 | A |   | 12/2000 | Jan et al. |
| 6,230,416 | B1 |   | 5/2001 | Trigilio |
| 6,260,283 | B1 | * | 7/2001 | Abernathy et al. ........... 33/473 |
| 6,453,568 | B1 | * | 9/2002 | Hymer ................ 33/DIG. 21 |
| 6,487,783 | B1 | * | 12/2002 | Thomas, Jr. ................ 33/286 |
| 6,629,370 | B1 | * | 10/2003 | Sposato .................... 33/485 |
| 6,839,974 | B1 | * | 1/2005 | Hitchcock ................. 33/473 |
| 6,944,962 | B2 | * | 9/2005 | Tessel et al. ............... 33/414 |
| 2002/0021566 | A1 |   | 2/2002 | Lee |
| 2002/0065462 | A1 |   | 5/2002 | Brabrand et al. |
| 2002/0131267 | A1 |   | 9/2002 | Van Osenbruggen |
| 2005/0155238 | A1 | * | 7/2005 | Levine et al. ............... 33/286 |
| 2006/0000099 | A1 | * | 1/2006 | Tessel et al. ............... 33/414 |
| 2006/0016083 | A1 | * | 1/2006 | Huang ..................... 33/286 |

FOREIGN PATENT DOCUMENTS

WO    99/02310    1/1999

* cited by examiner

*Primary Examiner*—G. Bradley Bennett
(74) *Attorney, Agent, or Firm*—Michael J. Striker (57) ABSTRACT

In a marking device having a laser and a fastening element, especially simple, fast and precise marking of workpieces is attained by providing that the marking device includes a goniometer.

27 Claims, 8 Drawing Sheets

LASER MARKING DEVICE

CROSS-REFERENCE

The invention described and claimed hereinbelow is also described in PCT/EP 2005/054945, filed on Sep. 30, 2005 and DE 10 2004 047 603.0 A1, filed Sep. 30, 2004. This German Patent Application, whose subject matter is incorporated here by reference, provides the basis for a claim of priority of invention under 35 U.S.C. 119(a)-(d).

BACKGROUND OF THE INVENTION

The invention is based on a marking device.

Power tools with lasers are known in the prior art. The integrated laser serves as an orienting aid in machining workpieces.

International Patent Disclosure WO 99/02310, for instance, discloses a circular saw with a laser element integrated in the handle. This laser element generates a line in the sawing direction on the workpiece to be machined. The line predetermined by the laser beam serves the circular saw user as an orientation in sawing. The laser beam is made as much as possible to coincide with a scribed line drawn in advance, for instance.

A disadvantage of this known circular saw with a laser is that the saw blade, which is downstream of the laser beam, can drift away from the scribed line. Precise cutting is thus not guaranteed. Moreover, the laser beam is merely an orienting aid in sawing. In actuality, a user of the circular saw, who with it wants to make a straight cut through a workpiece, for instance, must first continue to draw the desired cut in the workpiece in the form of a scribed line. To do so, he requires various drawing tools as well, such as a pencil, a measuring tape, and a goniometer. Only then, based on the drawn-in scribed line, can the user begin sawing.

SUMMARY OF THE INVENTION

A marking device according to the invention has the advantage over the prior art that when this marking device is used, the scribed line that is otherwise required can be dispensed with entirely. Additional aids for drawing the scribed line, such as a goniometer and a ruler, are no longer necessary. With the marking device of the invention, the otherwise required scribed line is replaced entirely by a pointing or marking beam emitted by the laser. Thus a clear line can be reproduced on a workpiece, even over relatively long distances, and along this line the user can saw and thus achieve a straight cut. Even uneven surfaces, where a scribed line is difficult to draw, can now be easily and cleanly machined with the aid of the marking device.

The marking device is preferably a frame of plastic or metal. The laser, the fastening element, and the goniometer are then located at various places on this frame.

The laser is preferably designed in the form of an independent component with its own housing. In this housing, there can be at least one laser diode. The interior of the housing can also be conceived of such that there is space in it for one or more batteries for supplying power.

It is advantageous if the laser is located detachably on the marking device, so that the laser can also be used independently of the marking device, for instance as a pointer. The length measuring device can in particular be detachable from the marking device via a suitable snap connection.

The fastening element serves to fasten the marking device to a workpiece to be machined. By means of the fastening element, the marking device can be connected securely and firmly to a workpiece, so that it maintains its position while the workpiece is being machined. The fastening element preferably includes a screw clamp. With a screw clamp of this kind, not only can the marking device be fixed on the corresponding workpiece, but the workpiece can additionally be fixed to a work plate located under it.

The fastening element may also include one or more sharp points or thorns. In the fixation of the marking device, they penetrate into the workpiece and thus assure the additional stability.

The goniometer of the marking device of the invention may also be known as a protractor or graduator. It preferably includes a circular element with an angle division. The goniometer may be designed as an integral component of the marking device. However, it may also be detachable from the marking device.

It is advantageous if the laser is located rotatably on the marking device. Then the marking beam of the laser can be oriented variously depending on the use. The orientation of the laser is preferably settable with the aid of the goniometer. In the latter case, the laser can then be rotatably supported on the goniometer. The marking device of the invention may also include a length measuring device. With such a device, all the distances can then additionally be set without having to make a scribed line on the corresponding workpiece. The length measuring device accordingly replaces the separate folding yardstick or the separate measuring tape.

The length measuring device is preferably a measuring tape. This measuring tape may in particular be an independent component, which is detachable from the marking device and can be used independently of it.

The length measuring device may also be a surveyor's rod. Preferably, the surveyor's rod is part of a parallel stop with a suitable measurement scale.

If the length measuring device is a surveyor's rod, then the goniometer may be located on the surveyor's rod and can be adjustable along it. Thus different spacings from the edge of a workpiece, for instance, can be set.

In a preferred embodiment of the invention, the marking device may additionally include a yoke. This is preferably a curved portion, shifted to the rear, of the marking device. The yoke assures that the cut through a workpiece can be done all the way to the end.

Finally, the goniometer may be located on the yoke, in particular being designed as part of the yoke. The laser can also be located on the yoke.

It is further proposed that the laser be adjustable along a path. As a result, flexible adjustment of the laser in a fixed marking device can advantageously be made possible.

If the path has at least one curved portion, then upon a motion of the laser along the path, a rotation of the laser can be achieved simultaneously. As a result, an advantageous compensatory motion can be attained. Alternatively or in addition, the marking device can be provided with a coupling unit, which is intended for coupling an adjusting motion of the laser along the path with a rotary motion of the laser. This coupling unit may be a mechanical unit, such as a gear, or an electronic unit.

In this connection, it is also proposed that the path include a circular arc. As a result, a compensatory motion can be achieved especially simply, with only a few additional components. A center point of the circular arc preferably serves to mark a preferred starting point on the workpiece. The center point may be the center of the circular arc or a point along the center axis of the circular arc. The center axis of the circular arc is an axis which is oriented perpendicular to the plane of the circular arc and intersects this plane in the center of the circular arc.

If the yoke is intended for guiding the laser along the path, then a compact structure of the marking device can be attained, since an additional guide means can be avoided.

It is also proposed that the length measuring device be intended for measuring along a measuring shaft, and a center point of the circular arc is located on the measuring shaft. A precise marking of a measured distance on the measuring shaft can be achieved that is independent of a position of the laser along the circular arc. If the length measuring device is embodied as a measuring tape, then the measuring shaft is advantageously formed by one edge of the measuring tape.

In a further embodiment of the invention, the marking device has a unit by means of which an orientation of at least one marking means is adaptable. As a result, high flexibility in the use of the marking device can be achieved.

It is furthermore proposed that the unit be formed by a fastening unit, and as a result additional components, effort of assembly, and expense can be saved. With the aid of the fastening unit, the laser, a length measuring device, and/or other elements that appear useful to one skilled in the art and belong to the marking device can be secured on the marking means.

The fastening unit advantageously has fastening elements, which are associated with at least two orientations of the marking means. As a result, adapting the orientation of the marking means can be done with little effort, by simple modification of the marking device.

In this connection, it is proposed that the fastening unit has fastening elements which are located symmetrically relative to a plane. As a result, from the mode of construction of the fastening unit, a user can easily perceive how to proceed to modify the marking means.

BRIEF DESCRIPTION OF THE DRAWINGS

Further advantages will become apparent from the ensuing description of the drawings. In the drawings, exemplary embodiments of the invention are shown. The drawings, description and claims include numerous characteristics in combination. One skilled in the art will expediently consider these characteristics individually as well and put them together to make useful further combinations.

Shown are.

DETAILED DESCRIPTION OF THE EXEMPLARY EMBODIMENTS

Figure 1:
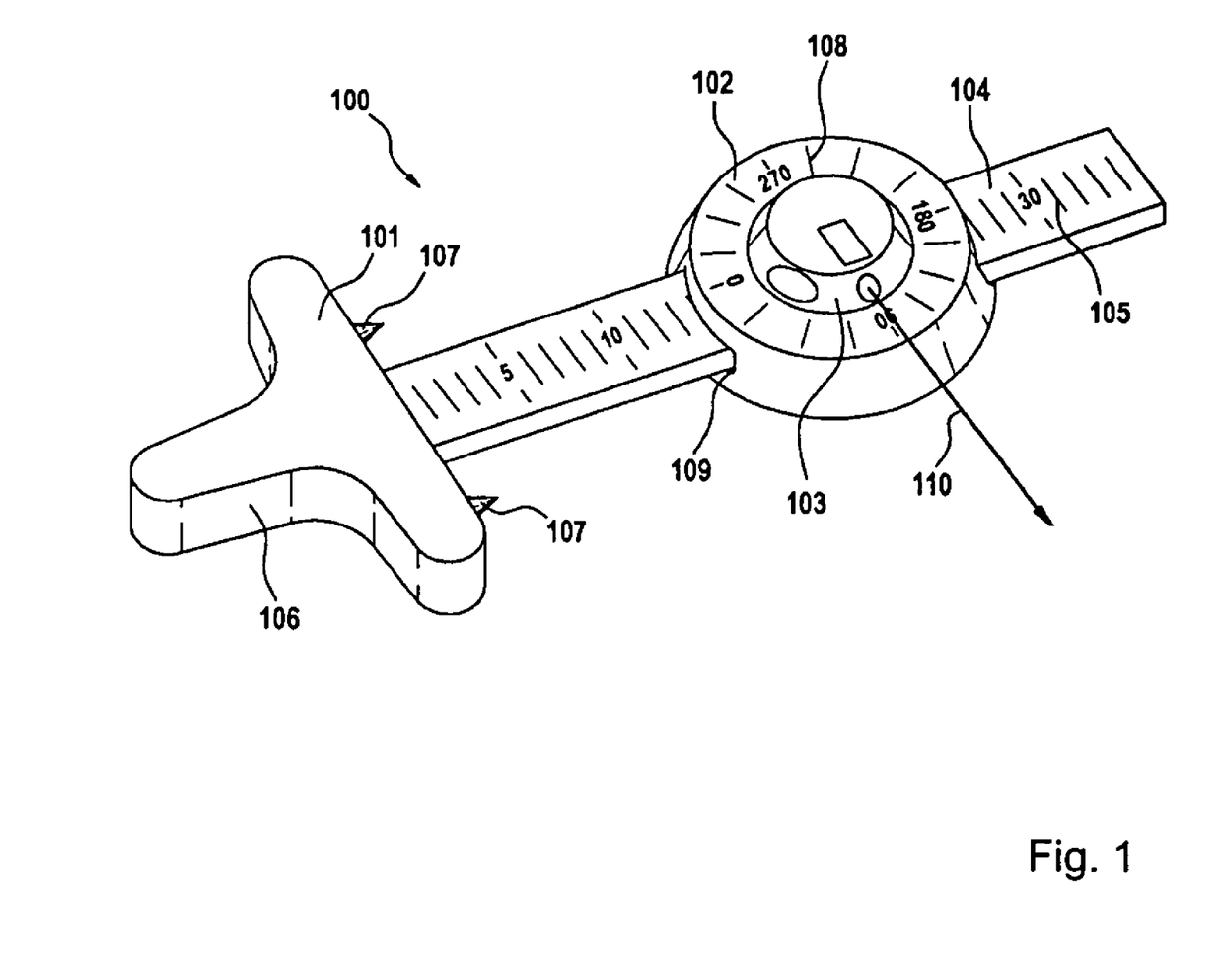
FIG. 1, a first embodiment of a marking device of the invention.

FIG. 1 shows a first marking device 100. The marking device 100 comprises a parallel stop 101, a protractor or goniometer 102, and a laser 103.

The parallel stop 101 has a surveyor's rod 104, which has a measurement scale 105 for measuring length. The parallel stop 101 furthermore has a handle 106 with two sharp points 107.

The protractor 102 is embodied in disklike form and has an angle division 108. The protractor 102 also has a passage 109, through which the surveyor's rod 104 of the parallel stop 101 is guided. As a result, the protractor 102 can be pushed back and forth along the surveyor's rod 104.

The laser 103 is rotatably supported freely over 360° on the protractor 102. The laser 103 emits a laser beam 110. By rotating the laser 103, the orientation of the laser beam 110 can be varied.

The mode of operation of the marking device 100 will be described below.

It is assumed that a user wants to make a straight cut through a wooden board, using a saber saw. For ascertaining and specifying the cutting line, the user makes use of the marking device 100. To that end, he first fastens the marking device 100 to the appropriate edge of the board. In the fastened state, the handle 106 is then flush with the edge, and the sharp points 107 have penetrated the board and thus fix the marking device 100 on the board. The surveyor's rod 104 rests with the protractor 102 on the surface of the board.

The user can then shift the protractor 102 along the surveyor's rod 104, until the correct cutting height is reached. Finally, all the user now has to do is to orient the laser 103. To that end, the laser 103 is rotated on the protractor 102, until it points in the correct direction. The angle of orientation of the laser 103 can be read off from the angle division 108 of the protractor 102. As soon as the cutting height and the orientation have been set, the laser 103 can be switched on. The laser beam 110 specifies the sawing direction to the user exactly. The user can then saw precisely through the board by sawing along the laser beam 110.

Figure 2:
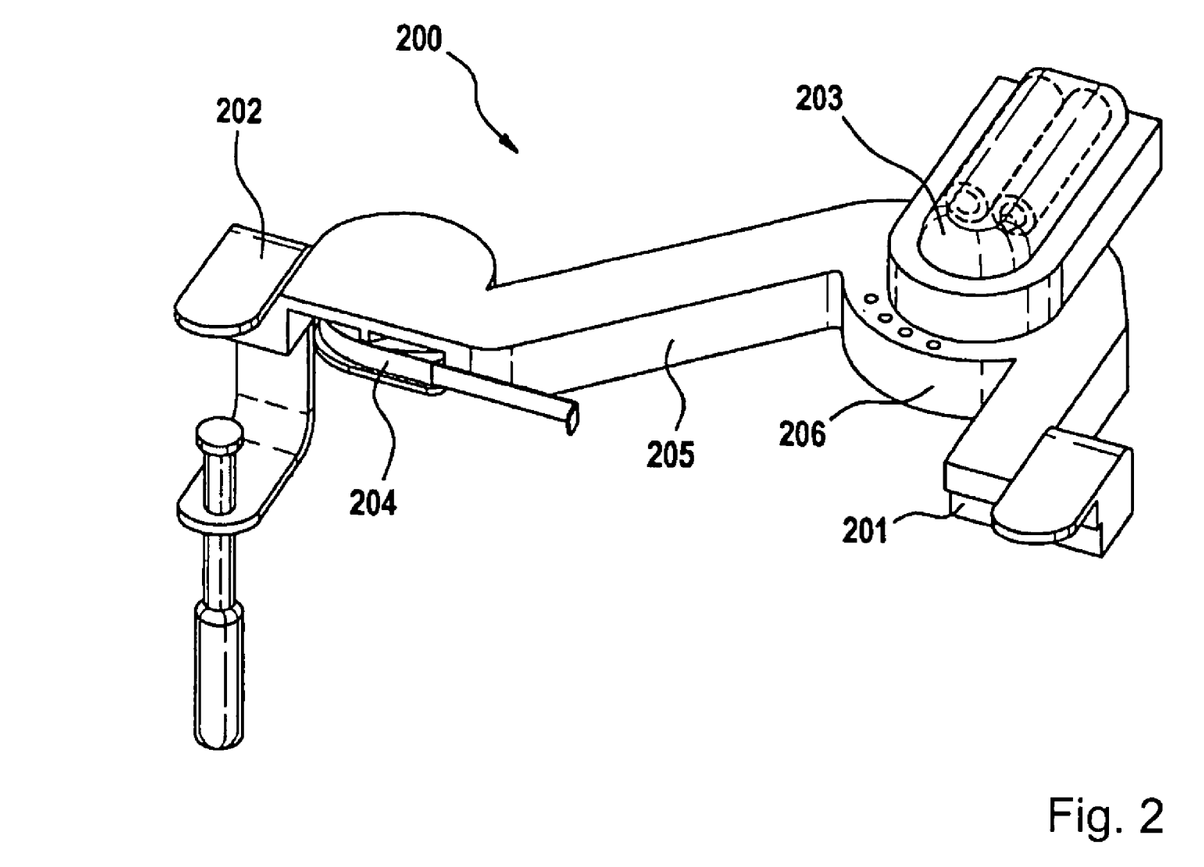
FIG. 2, a second embodiment of a marking device of the invention.

FIG. 2 shows a second marking device 200. The marking device 200 comprises a frame 201, a screw clamp 202, a laser 203, and a measuring tape 204. The frame 201 has a yoke 205. One part of the yoke 205 is formed by a protractor 206.

Figure 3:
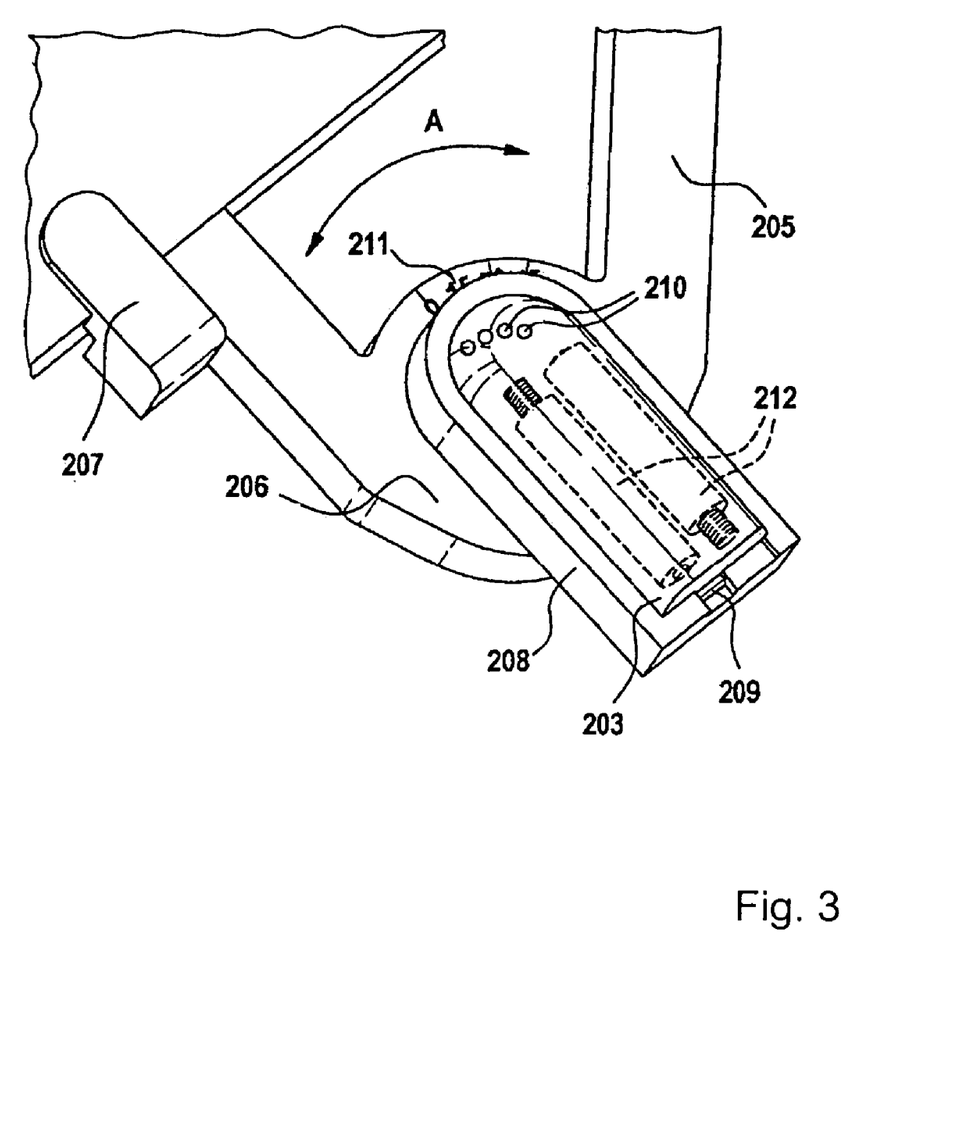
FIG. 3, the laser and goniometer of the marking device of FIG. 2.

In FIG. 3, the yoke 205 of the frame 201 can be seen in detail. On the yoke 205, there is a lug 207, with which the marking device 200 can be placed stably against a workpiece. The laser 203 can also be seen, which is driven via two batteries 212 and is supported rotatably on the protractor 206. More precisely, the laser 203 is located in a pivotable receptacle 208 of the protractor 206. The laser 203 can be detached from the receptacle 208 and held in it by way of a snap connection 209 that can be undone.

It is also provided that the removable laser 203 can be fastened as needed directly on a power tool, independently of the marking device 200, by means of a suitable snap connection. Thus the laser 203 can be mounted for instance directly on the head of a saber saw, in order to specify the cutting line for sawing.

The receptacle 208 is pivotable by up to 45°, as indicated by the double arrow A, and a plurality of detents 210 are provided on the protractor 206, which make it possible to fix the receptacle 208 at regular spacings of 15°. The corresponding angles are represented by an angle division 211.

Figure 4:
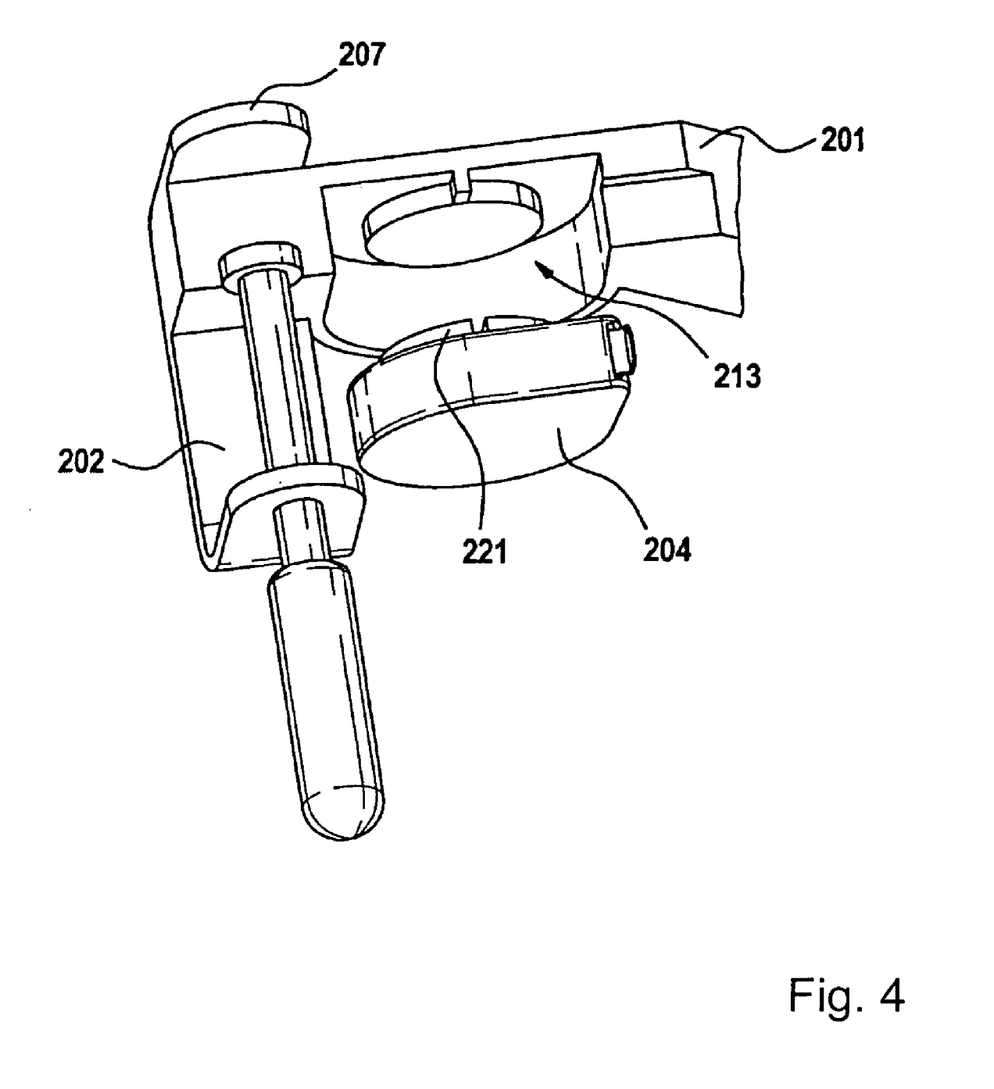
FIG. 4, the screw clamp and the measuring tape of the marking device of FIG. 2.

FIG. 4 represents the other end of the frame 201, with the screw clamp 202 and the measuring tape 204. The screw clamp 202 is designed in a known manner. With it, in cooperation with the lug 207, the marking device 200 can be fastened securely to a workpiece.

In its construction, the measuring tape 204 is equivalent to already known measuring tapes. However, the housing of the measuring tape 204 has a fastening means 221. With this fastening means, the measuring tape 204 can be fastened detachably in a hollow chamber 213 in the frame 201.

Figure 5:
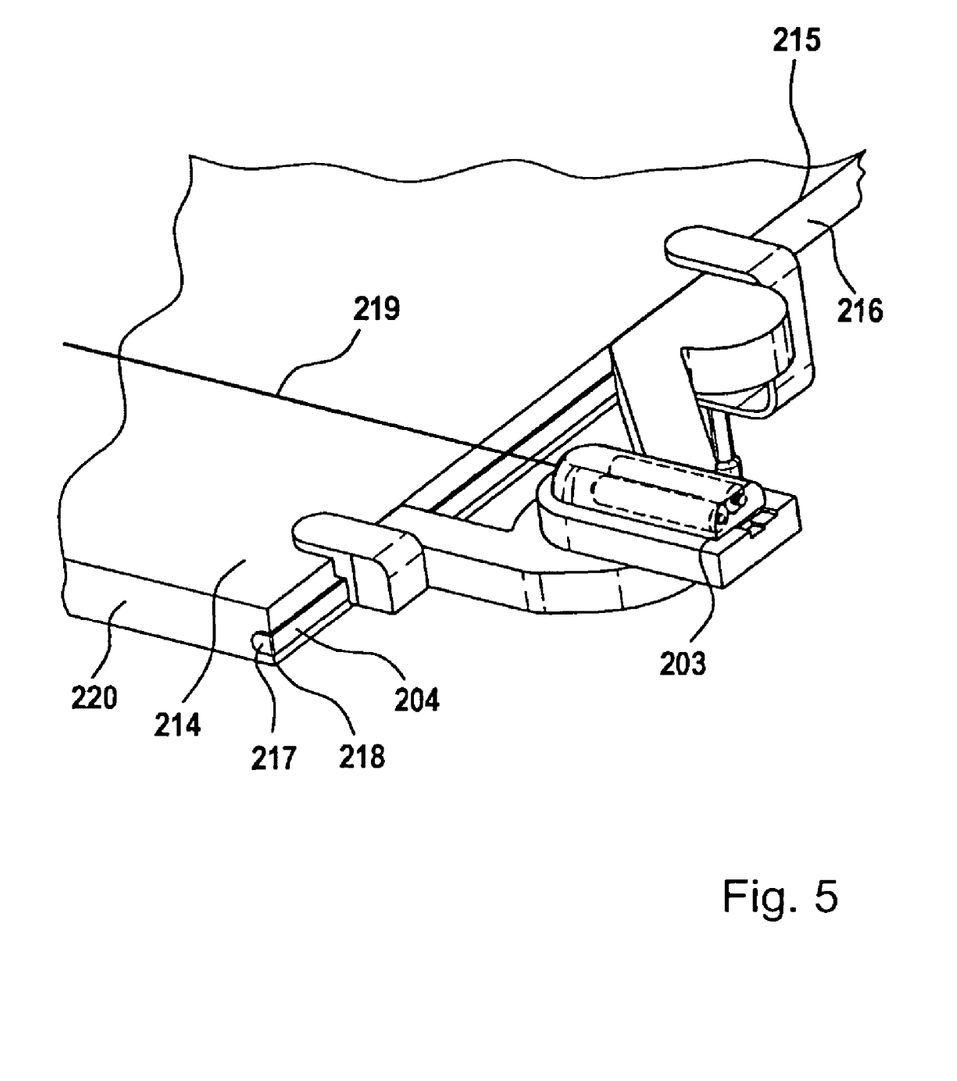
FIG. 5, the marking device of FIG. 2 in use on a workpiece.
Figure 6:
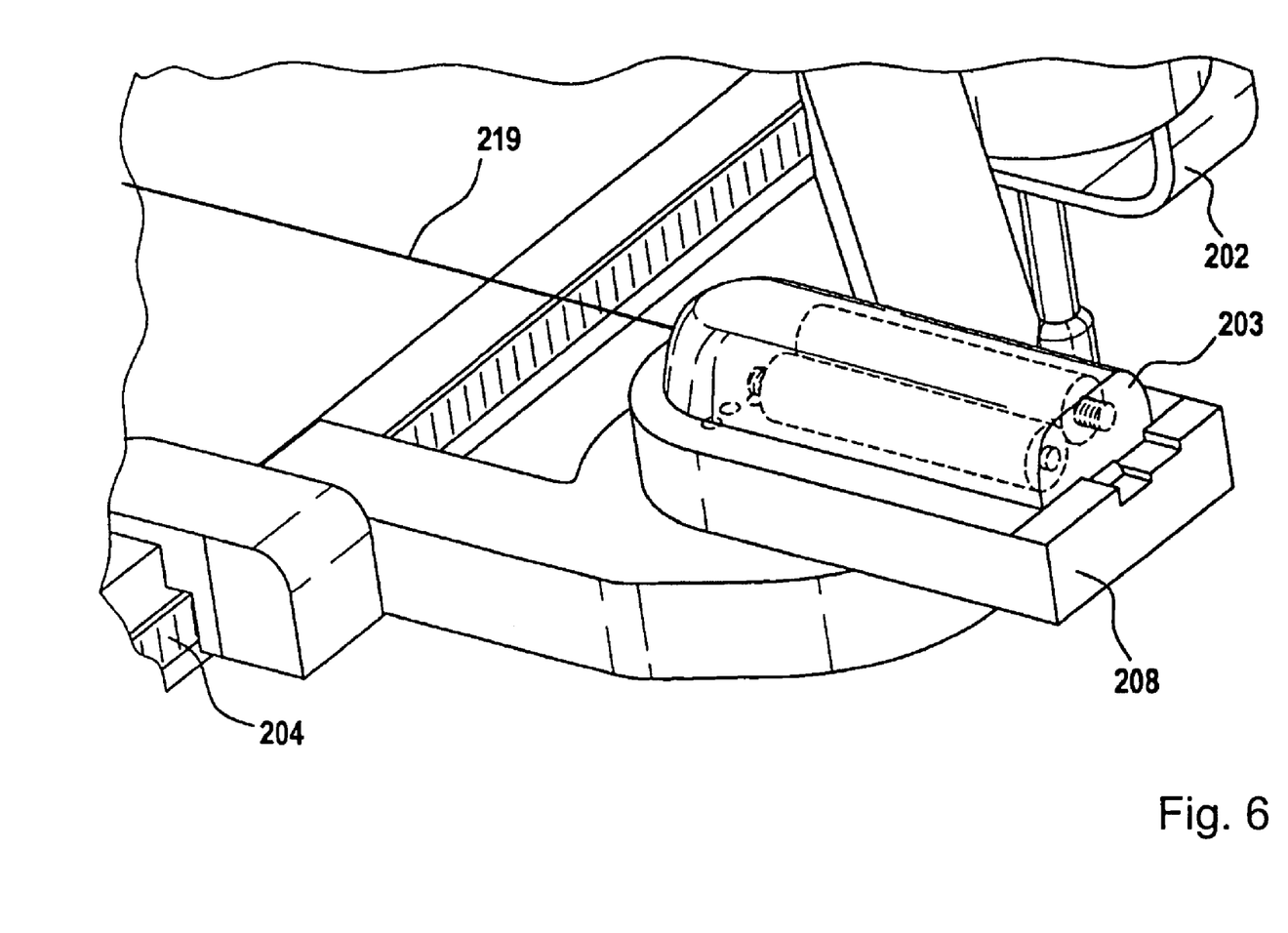
FIG. 6, an enlarged fragmentary view of FIG. 5.

The mode of operation of the marking device 200 will now be described, in conjunction with FIGS. 5 and 6.

It is assumed that with the marking device 200, a cutting line is to be reproduced on a workpiece 214. To that end, the marking device 200 is placed against the corresponding base edge 215 of the workpiece 214. The measuring tape 204 is pulled out and placed against the face 216 adjacent to the base edge 215. This is done in such a way that the protruding tab 217 on the end of the measuring tape 204 is placed on the corner 218 of the workpiece 214, so as to fix the measuring tape 204 on one end.

The laser 203 is now switched on. It produces a narrow laser beam 219. The position of this laser beam 219 must now be varied such that it coincides with the desired cutting line.

To that end, the laser 203 is first oriented, by rotation of the receptacle 208, in such a way that the laser beam 219 extends parallel to the lower end 220 of the workpiece 214. This presetting is necessary especially whenever the lower end 220 of the workpiece 214 is not perpendicular to the base edge 215. In the example shown in FIG. 5, the lower end 200 is at a right angle to the base edge 215, so that in this case the receptacle 208 can remain in the 0° position as shown by the angle division 211.

The user, if he wants to make a cut that does not extend parallel to the lower end 220, can now pivot the receptacle 208 in order to set the desired angle relative to the lower end 220. To that end, the receptacle 208 is rotated, with the laser 203 located on it, until such time as the desired angle indicated by the angle division 211 is reached and the laser beam 219 is pointing in the desired direction. Via one of the detents 210, the laser 203 is securely fixed in the desired direction.

Finally, the laser beam 219 must be brought to the correct height; that is, the laser beam 219 must have the correct spacing from the lower end 220 of the workpiece 214. The corresponding height adjustment is shown in detail in FIG. 6.

The marking device 200 is moved along the base edge 215 until such time as the laser beam 219 is at the desired height, as indicated by the scale on the measuring tape 204. The marking device 200 is then braced to the workpiece 214 and thus fixed by tightening the screw clamp 202. The laser beam 219 is now located securely at the correct height.

The laser beam 219 specifies the correct cutting line precisely, so that machining of the workpiece 214 can be begun.

With the marking devices 100 and 200 described, a user can safely and precisely machine workpieces without first having to draw scribed lines for the purpose. The scribed line is replaced by a laser beam, which can be positioned and oriented precisely. The numerous drawing tools needed to draw a scribed line are no longer needed, since the marking devices 100 and 200 combine all the necessary functions in one device. Thus with the marking devices 100 and 200, the marking of workpieces can be done especially quickly, simply and precisely.

Figure 7:
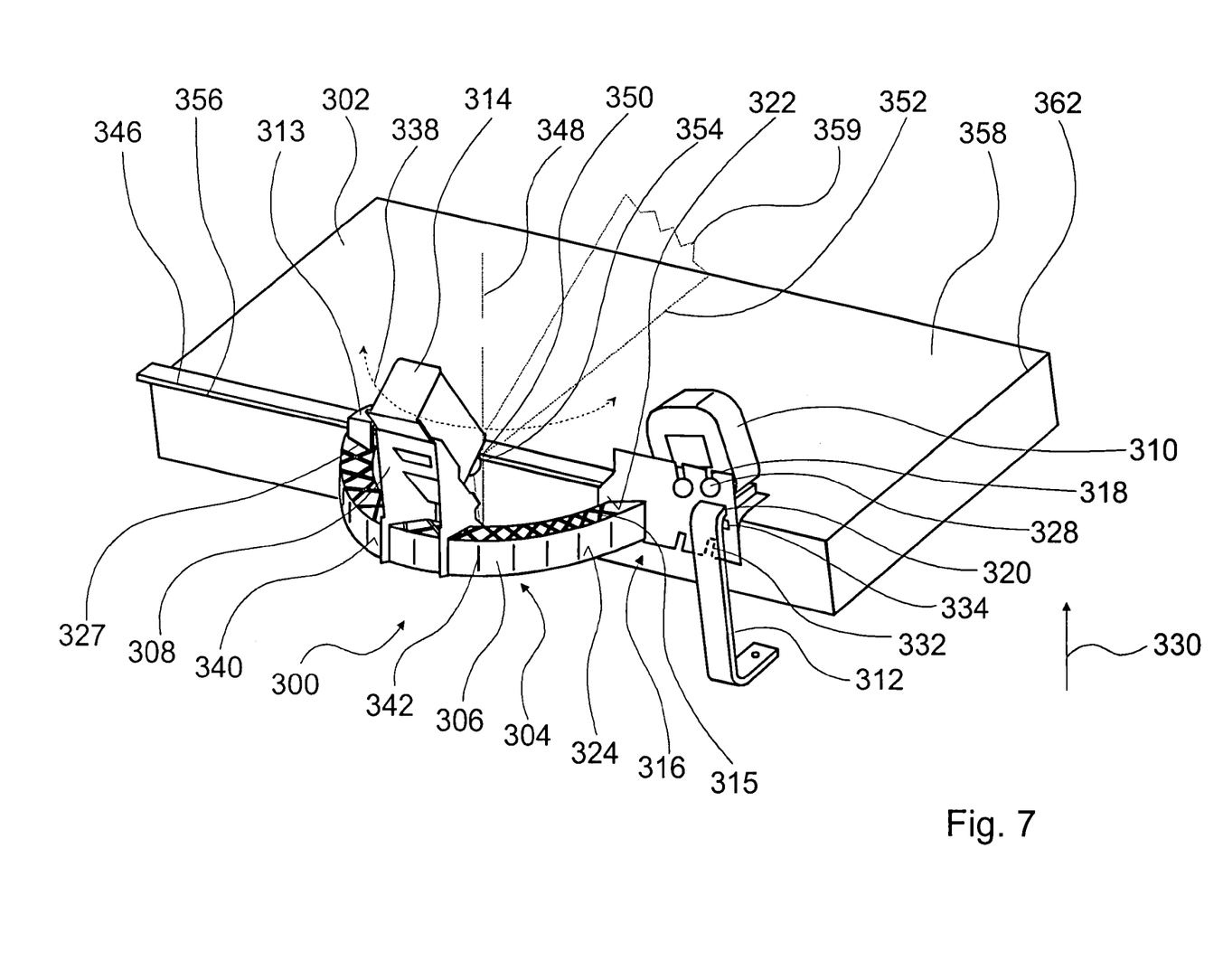
FIG. 7, a third embodiment of a marking device, secured to a workpiece, with a laser that is movable along a yoke.

In FIG. 7, a further embodiment of a marking device 300 is shown, which rests on a workpiece 302. It includes a marking means 304 with a yoke 306. An adjusting slide 308, a length measuring device 310 embodied as a measuring tape, a screw clamp 312 for fastening the marking means 304 to the workpiece 302, and a lug 313 are secured to the marking means 304. A laser 314 is received in the adjusting slide 308. The yoke also has ribs 315.

For fastening the length measuring device 310, the screw clamp 312, the adjusting slide 308, and the lug 313, the marking device 300 is provided with a fastening unit 316, which has fastening elements 318, 320, 322, 324, 326 (FIG. 8), 327. The fastening elements 318 are embodied as slits in the marking means 304, in which fastening means 328 of the length measuring device 310 are located. The fastening element 320 is embodied as a further slit in the marking means 304, into which the screw clamp 312 is introduced. The fastening elements 322, 324, 326 (FIG. 8) are embodied as outer faces of the yoke 306, on which faces the adjusting slide 308 is fastened in the axial direction 330 and the radial direction of the yoke 306. These outer faces of the yoke 306 also serve to guide the adjusting slide 308, which is adjustable along the yoke 306. The fastening element 327 is embodied as a slit in the yoke 306, into which the lug 313 is introduced.

The fastening unit 316 furthermore includes further fastening elements 332, 334 and 336 (FIG. 8), which allow the marking means 304 to be placed on the workpiece 302 with an alternative orientation relative to the workpiece 302, as will be described in further detail in conjunction with FIG. 8.

The yoke 306 is designed in the form of a circular arc. The laser 314 is thus located adjustably along a path 338 on the marking device 300, and the path 338 is embodied as a circular arc. The yoke 306 moreover has an outer face that is embodied as a goniometer 340. The goniometer has an angle division 342, by means of which an angular position of the laser 314 can be read off.

The measuring tape corresponds in its construction to already known measuring tapes. A distance can be read off along a measuring shaft 346, which is formed by one edge of the measuring tape. The design of the yoke 306 and of the measuring tape is selected such that the center axis 348 of the path 338, embodied as a circular arc, intersects the measuring shaft 346 at a center point 350.

It is assumed that a user wants to perform a straight cut, using a saber saw, in the workpiece 302 along a desired section line 352, beginning at a starting point 354 on a base edge 356. To that end, the marking device 300 is placed against the base edge 356 of the workpiece 302. The measuring tape is pulled out along the measuring shaft 346 and placed against a face 358 adjoining the base edge 356. The laser 314, which is aimed at the center axis 348, is switched on and generates a laser beam in a beam plane 359. The marking means 304 is then pushed along the base edge 356 until a desired distance along the measuring shaft 346 is reached. In this position, the marking means 304 is then fastened to the workpiece 302 by means of the screw clamp 312. The laser 314 can now be adjusted along the path 338, until the laser beam covers the desired section line 352. The beam plane 359 now rotates about the center axis 348 of the path 338, and the laser marking of the starting point 354 on the measuring tape is therefore independent of the position of the laser 314 along the path 338. This position can be set and monitored with the aid of the goniometer 340 along the yoke 306.

Figure 8:
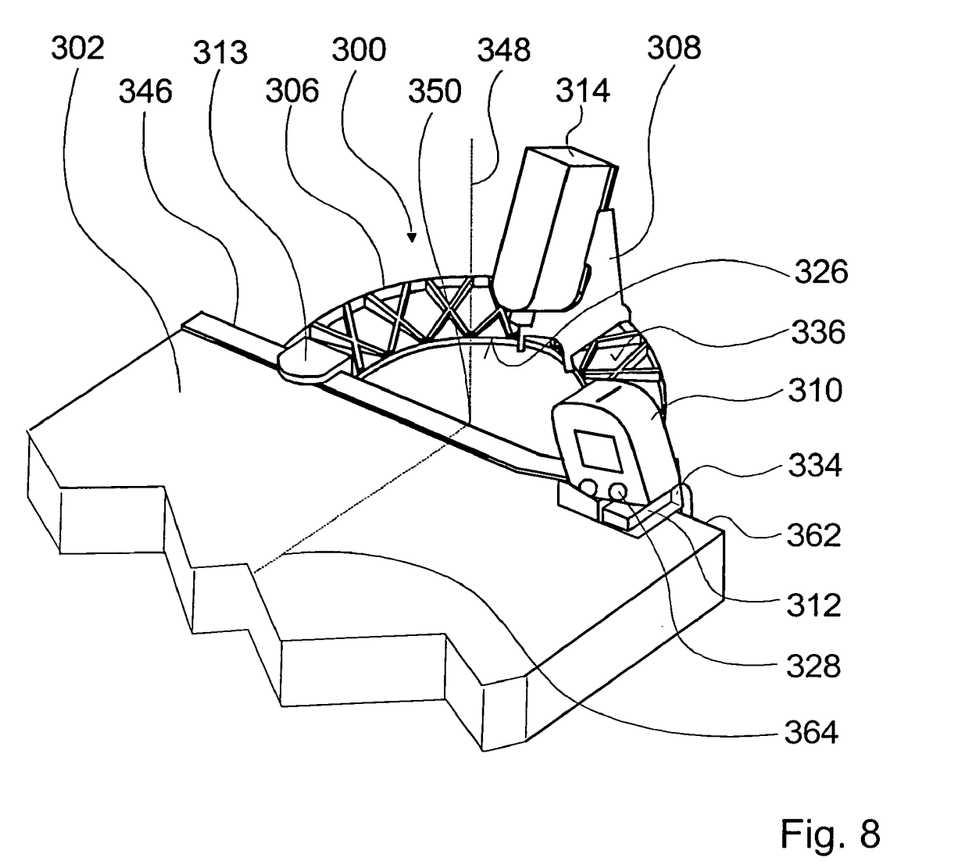
FIG. 8, the marking device in an alternative construction.

FIG. 8 shows the marking device 300, which rests on the workpiece 302 with a further orientation to the workpiece 302. In this configuration, further outer faces of the yoke 306 can be seen, which are embodied as fastening elements 326, 336 for fastening the adjusting slide 308.

The fastening elements of the fastening unit 316 can be divided into two groups, which are each associated with one orientation of the marking means 304 to the workpiece 302.

Figure 9:
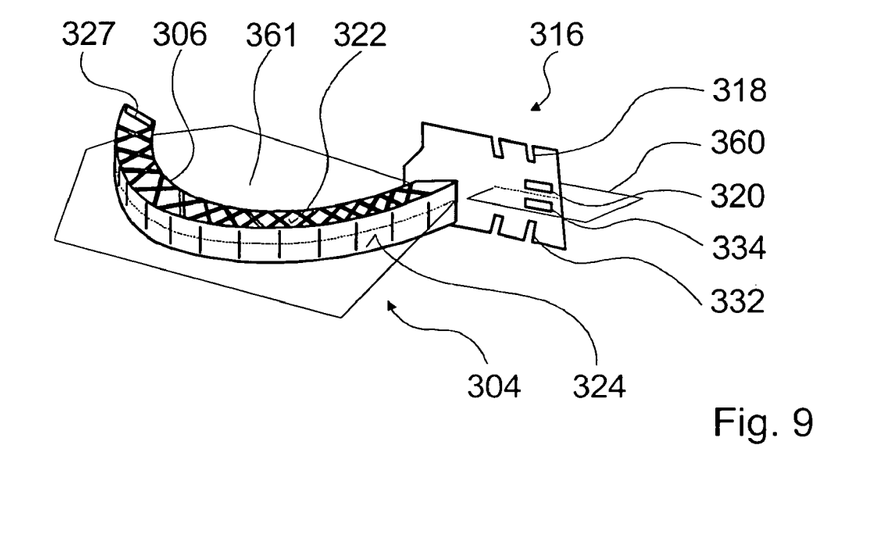
FIG. 9, a marking means of the marking device.

By means of the fastening elements 318, 320, 322, 324, 326, 327 of a first group, the marking device 300 can be designed in a way that allows placing the marking means 306 against the workpiece 302—as shown in FIG. 7. By means of the fastening elements of a second group, specifically the fastening elements 332 for fastening the measuring tape, the fastening element 334 for fastening the screw clamp 312, the fastening elements 324, 326, 336 for fastening to the adjusting slide 308, and a slit, not visible in the drawing, in the yoke 306 for fastening the lug 313, the marking means 304 can be designed in such a way that the orientation to the workpiece 302 as shown in FIG. 8 can be reached. Corresponding fastening elements of the two groups are located symmetrically to one another relative to planes 360, 361, as indicated in FIG. 9.

It is assumed that the user wants to make a cut in the workpiece 302 along a section line 364, beginning at a further edge 362 of the workpiece 302. Because of the symmetrical design of the fastening unit 316, a way of proceeding for adapting the orientation of the marking means 304 is easily apparent to the user. Beginning at the configuration shown in FIG. 7, the adjusting slide 308, the measuring tape, the screw clamp 312, and the lug 313 are detached from the marking means 304, and the marking means is then rotated 180° relative to the workpiece 302. The screw clamp 312 is then introduced into the fastening element 334. In order to fasten the measuring tape to the marking means 304 again, fastening means which are located on the measuring tape diametrically opposite the fastening means 328 are introduced into the fastening elements 332 embodied as slits. The lug 313 is introduced into a slit in the yoke 306 that is not visible in FIG. 8. The adjusting slide 308 is then placed on the yoke 306 and fastened in the axial direction 330 and the radial direction of the yoke 306 by means of the outer faces of the yoke 306, which are embodied as fastening elements 324, 326, 336.

LIST OF REFERENCE NUMERALS

100 Marking device
101 Parallel stop
102 Goniometer
103 Laser
104 Surveyor's rod
105 Measurement scale
106 Handle
107 Sharp point
108 Angle division
109 Passage
110 Laser beam
200 Marking device
201 Frame
202 Screw clamp
203 Laser
204 Measuring tape
205 Yoke
206 Protractor
207 Lug
208 Receptacle
209 Snap connection
210 Detent
211 Angle division
212 Battery
213 Hollow chamber
214 Workpiece
215 Base edge
216 Face
217 Tab
218 Corner
219 Laser beam
220 End
221 Fastening means
300 Marking device
302 Workpiece
304 Marking means
306 Yoke
308 Adjusting slide
310 Device
312 Screw clamp
313 Lug
314 Laser
315 Rib
316 Fastening unit
318 Fastening element
320 Fastening element
322 Fastening element
324 Fastening element
326 Fastening element
327 Fastening element
328 Fastening means
330 Axial direction
332 Fastening element
334 Fastening element
336 Fastening element
338 Path
340 Goniometer
342 Angle division
346 Measuring shaft
348 Center axis
350 Center point
352 Section line
354 Starting point
356 Base edge
358 Face
359 Beam plane
360 Plane
361 Plane
362 Edge
364 Section line
A Double arrow

The invention claimed is:

1. A marking device, comprising:
   a laser (103, 203, 314), wherein said laser emits a marking beam (110, 219, 352, 364) in an operation mode to reproduce a clear line on a work piece (214, 302) to provide a scribed line; and
   a fastening element (107, 202, 312), wherein the marking device (100, 200, 300) includes a goniometer (102, 206, 340).

2. The marking device as recited in claim 1, wherein the laser (103, 203) is located rotatably on the marking device (100, 200).

3. The marking device as recited in claim 2, wherein the orientation of the laser (103, 203) is settable with the aid of the goniometer (102, 206).

4. The marking device as recited in claim 1, wherein the laser (103, 203) is located detachably on the marking device (100, 200).

5. The marking device as recited in claim 1, wherein the marking device (100, 200) includes a length measuring device (104, 204, 310).

6. The marking device as recited in claim 5, wherein the length measuring device (104, 204, 310) is a measuring tape (204).

7. The marking device as recited claim 1, wherein the marking device (200) includes a yoke (205, 306).

8. The marking device as recited in claim 5, wherein the length measuring device (104, 204) is a surveyor's rod (104).

9. The marking device as recited in claim 8, wherein the goniometer (102) is located on the surveyor's rod (104) and is adjustable along it.

10. The marking device as recited in claim 7, wherein the goniometer (206, 340) is located on the yoke (205, 306).

11. The marking device as recited in claim 1, wherein the fastening element (107, 202, 312) includes a screw clamp (202).

12. The marking device as recited in claim 1, wherein the laser (314) is adjustable along a path (338).

13. The marking device as recited in claim 12, wherein the path (338) has at least one curved portion.

14. The marking device as recited in claim 13, wherein the path (338) includes a circular arc.

15. The marking device as recited in claim 7, wherein the yoke (306) is intended for guiding the laser (314) along the path (338).

16. The marking device as recited in claim 14, wherein the length measuring device (310) is intended for measurement along a measuring shaft (346), and a center point (350) of the circular arc is located on the measuring shaft (346).

17. The marking device as recited in claim 1, further comprising a unit by means of which an orientation of at least one marking means (304) is adaptable.

18. The marking device as recited in claim 17, wherein the unit is formed by a fastening unit (316).

19. The marking device as recited in claim 18, wherein the fastening unit (316) has fastening elements (318, 320, 322, 324, 326, 327, 332, 334, 336), which are associated with at least two orientations of the marking means (304).

20. The marking device as recited in claim 18, wherein the fastening unit (316) has fastening elements (318, 320, 322, 324, 326, 327, 332, 334, 336) which are located symmetrically relative to a plane (360, 361).

21. The marking device as recited in claim 1, wherein the laser (103, 203, 314) comprises means for emitting a marking beam (110, 219, 352, 364) to reproduce a scribed line on a work piece (214, 302).

22. The marking device as recited in claim 7, wherein the yoke (205, 306) has a curved portion, shifted to the rear, extending away from the fastening element (107, 202, 312) of the marking device (100, 200 300).

23. The marking device as recited in claim 7, wherein the yoke (205, 306) surrounds a part of a hollow space.

24. The marking device as recited in claim 23, wherein the hollow space is arranged between the yoke (205, 306) and a connection plane of end regions of the yoke (205, 306) where elements (202, 207, 313, 316) are arranged.

25. The marking device as recited in claim 24, wherein the yoke (205, 306) and the hollow space form an arrangement configured to assure that the cut through a work piece (214, 302) is performed completely to an end where the marking device (200, 300) is arranged.

26. The marking device as recited in claim 7, wherein the yoke (306) is designed in the form of a circular arc.

27. The marking device as recited in claim 7, wherein the yoke (306) and the path (338) are formed integrally with each other.

* * * * *